(12) United States Patent
Matsuhashi et al.

(10) Patent No.: US 10,116,875 B2
(45) Date of Patent: Oct. 30, 2018

(54) IMAGE PICKUP APPARATUS AND METHOD FOR CONTROLLING THE SAME TO PREVENT DISPLAY OF A THROUGH IMAGE FROM BEING STOPPED WHEN A SHUTTER UNIT IS NOT COMPLETELY OPENED

(71) Applicant: Olympus Corporation, Hachioji-shi, Tokyo (JP)

(72) Inventors: Takayuki Matsuhashi, Hino (JP); Haruyuki Ishihara, Hino (JP); Ryosuke Mochizuki, Hino (JP); Mika Muto, Tachikawa (JP)

(73) Assignee: Olympus Corporation, Tokyo (JP)

( * ) Notice: Subject to any disclaimer, the term of this patent is extended or adjusted under 35 U.S.C. 154(b) by 85 days.

(21) Appl. No.: 15/138,932

(22) Filed: Apr. 26, 2016

(65) Prior Publication Data

US 2016/0323493 A1    Nov. 3, 2016

(30) Foreign Application Priority Data

May 1, 2015   (JP) ................................. 2015-094380
May 1, 2015   (JP) ................................. 2015-094381
May 1, 2015   (JP) ................................. 2015-094382

(51) Int. Cl.
*H04N 5/235* (2006.01)
*H04N 5/232* (2006.01)

(52) U.S. Cl.
CPC ....... *H04N 5/2353* (2013.01); *H04N 5/23293* (2013.01)

(58) Field of Classification Search
CPC .......................... H04N 5/2353; H04N 5/23293
USPC ....................................................... 348/231.99
See application file for complete search history.

(56) References Cited

U.S. PATENT DOCUMENTS

| | | | | |
|---|---|---|---|---|
| 2006/0140619 | A1* | 6/2006 | Iijima | .................... H04N 5/232 396/287 |
| 2007/0103544 | A1* | 5/2007 | Nakazawa | ............. H04N 5/232 348/38 |
| 2014/0184866 | A1* | 7/2014 | Ogushi | .............. H04N 5/23212 348/308 |

FOREIGN PATENT DOCUMENTS

JP    2009-260510    11/2009

* cited by examiner

*Primary Examiner* — Lin Ye
*Assistant Examiner* — Chan T Nguyen
(74) *Attorney, Agent, or Firm* — John C. Pokotylo; Pokotylo Patent Services

(57) ABSTRACT

According to the present invention, an image pickup apparatus includes, an image pickup control unit which drives shutter unit and picks up a still image by image pickup device, captures a first through image by the image pickup device when the shutter unit is opened, and picks up a second through image including a light-shielded area by the image pickup device, the light-shielded area being formed by shielding part of light incident upon imaging plane by the shutter unit when the shutter unit is half light-shielded, and a display control unit which causes a display device to display a through image using at least the first through image and the second through image.

7 Claims, 14 Drawing Sheets

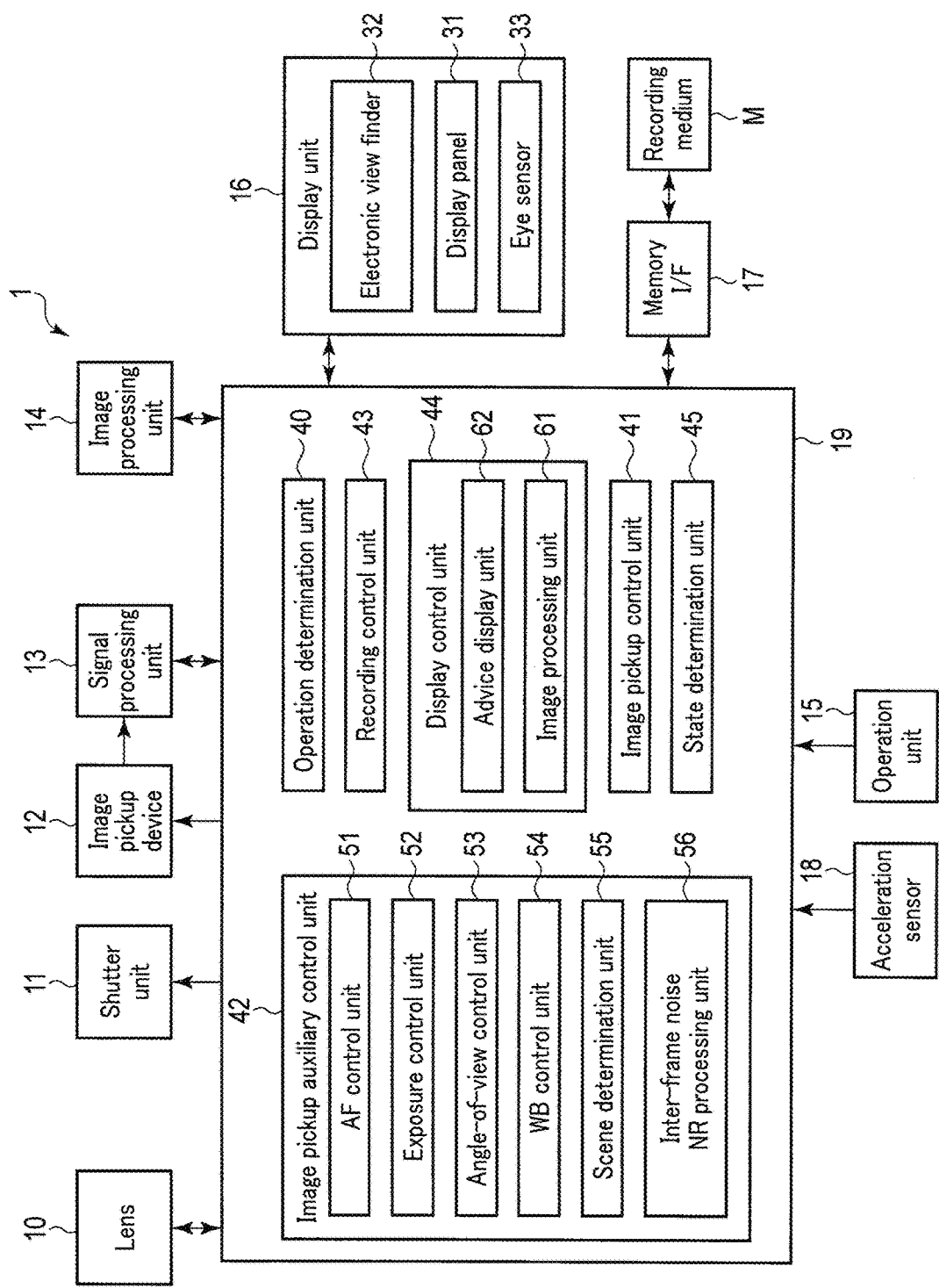
F I G. 1

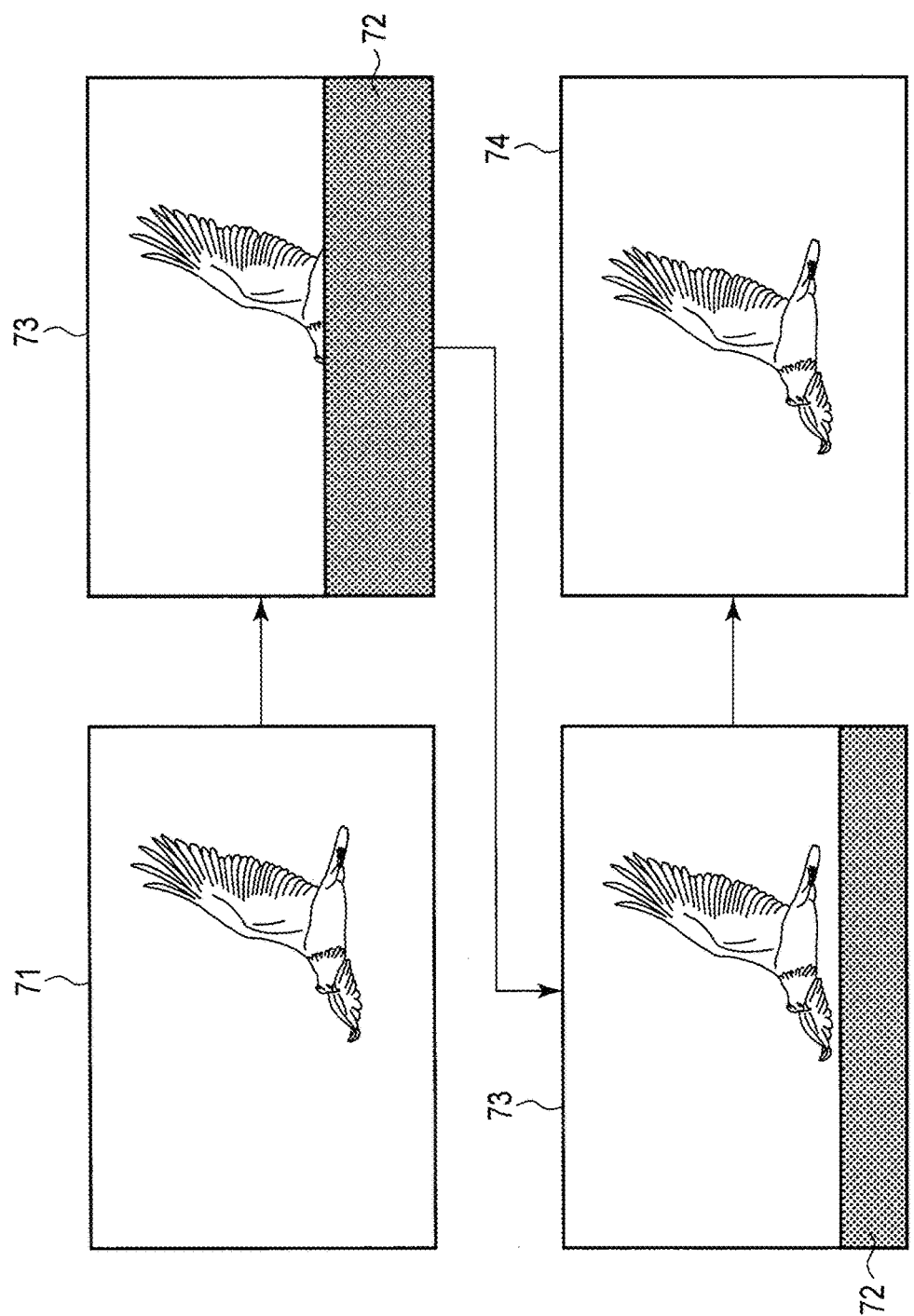
F I G. 6

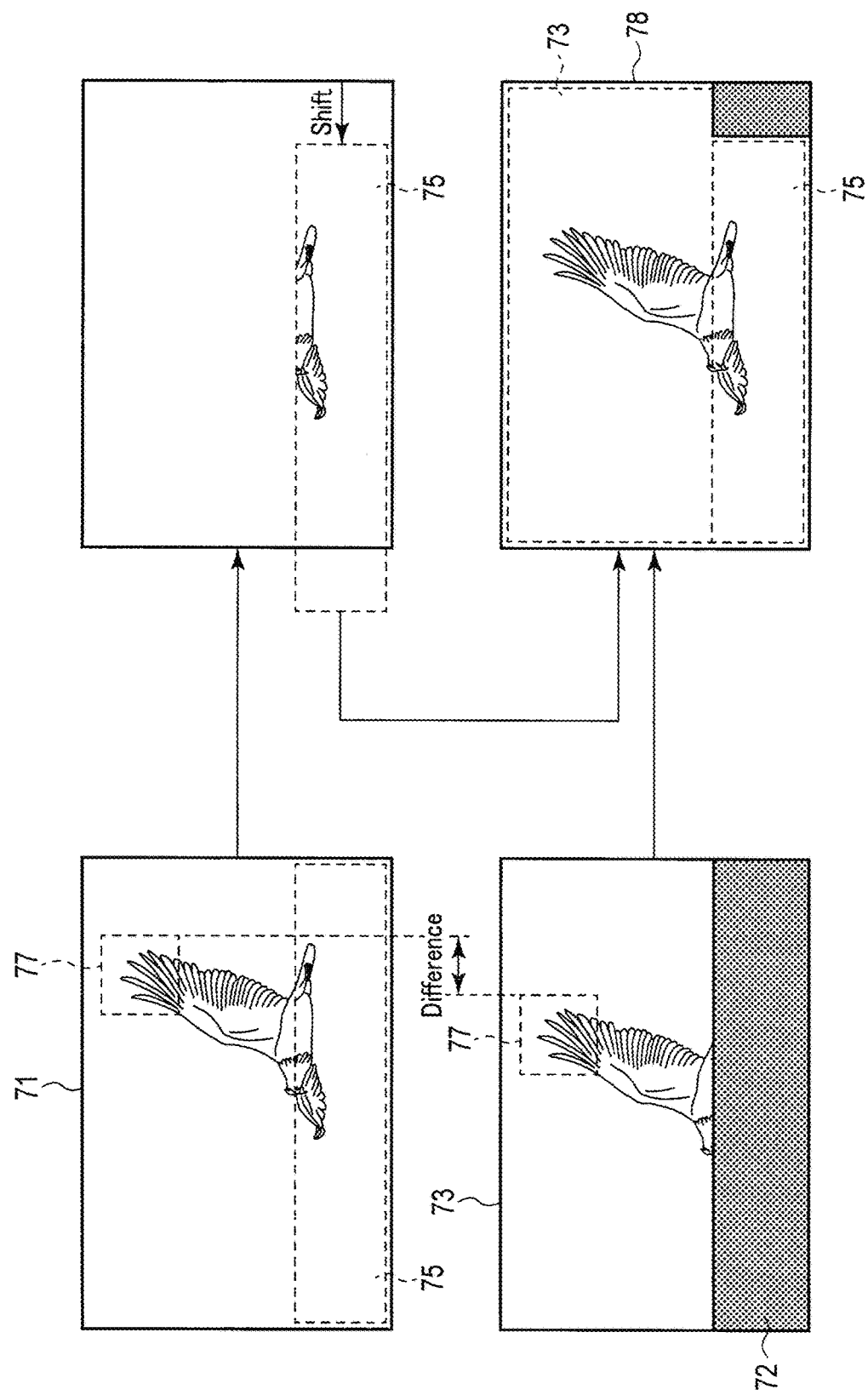
F I G. 8

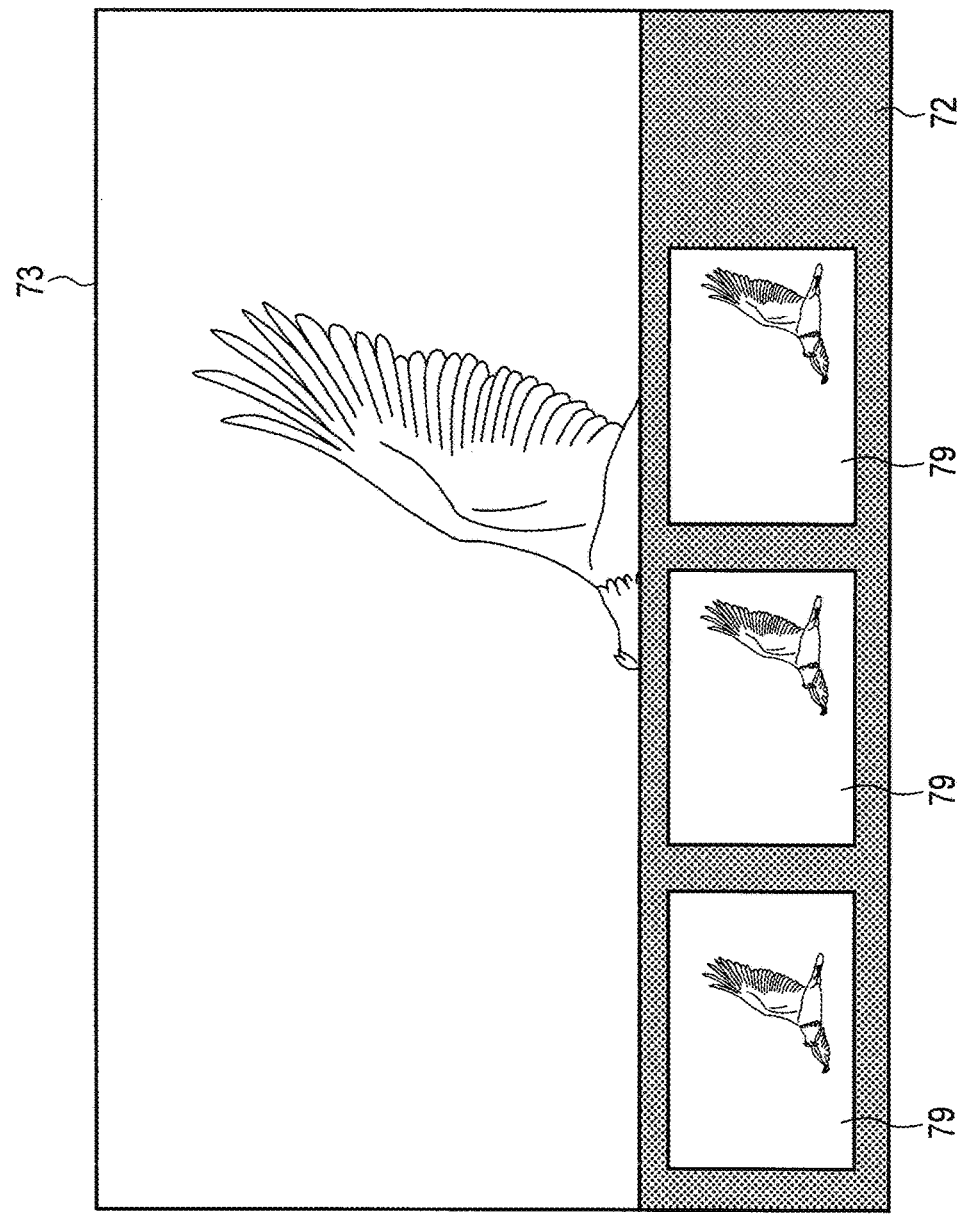
F I G. 15

IMAGE PICKUP APPARATUS AND METHOD FOR CONTROLLING THE SAME TO PREVENT DISPLAY OF A THROUGH IMAGE FROM BEING STOPPED WHEN A SHUTTER UNIT IS NOT COMPLETELY OPENED

CROSS-REFERENCE TO RELATED APPLICATIONS

This application is based upon and claims the benefit of priority from prior Japanese Patent Applications No. 2015-094380, filed May 1, 2015, No. 2015-094381, filed May 1, 2015 and No. 2015-094382, filed May 1, 2015, the entire contents all of which are incorporated herein by reference.

BACKGROUND OF THE INVENTION

1. Field of the Invention

The present invention relates to an image pickup apparatus and a method for controlling the same.

2. Description of the Related Art

Image pickup devices generally include an image pickup device for picking up an image based upon light, an optical system, such as a lens, for forming an image of the light on the image pickup device, a shutter for controlling time when light is incident upon the image pickup device through the optical system, and a display device for displaying the image picked up by the image pickup. For example, Jpn. Pat. Appln. KOKAI Publication No. 2009-260510 proposes an image pickup apparatus which allows a user to confirm an object by displaying a through image to display images picked up by the image pickup apparatus one by one.

BRIEF SUMMARY OF THE INVENTION

An image pickup apparatus as described above performs an image-pickup operation of stopping picking up a through image and operating a shutter to pick up a still image. When exposure is completed, the shutter is opened to resume picking up the through image. The image pickup apparatus cannot pick up a through image to darken display of the through image with timing when the shutter is not completely opened after the exposure is completed. Thus, the image pickup apparatus has the problem that a user is likely to lose sight of an object and the device is likely to be inconvenient.

It is therefore an object of the present invention to provide a more convenient image pickup apparatus and a method for controlling the same.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating an example of a control system of an image pickup apparatus according to one embodiment.

FIG. 6 is an illustration of an example of display of the image pickup apparatus according to one embodiment.

FIG. 8 is an illustration of still another example of display of the image pickup apparatus according to one embodiment.

FIG. 15 is an illustration of still another example of display of the image pickup apparatus according to one embodiment.

DETAILED DESCRIPTION OF THE INVENTION

An image pickup apparatus and a method for controlling the image pickup apparatus according to one embodiment will be described in detail below with reference to the accompanying drawings.

Figure 2:
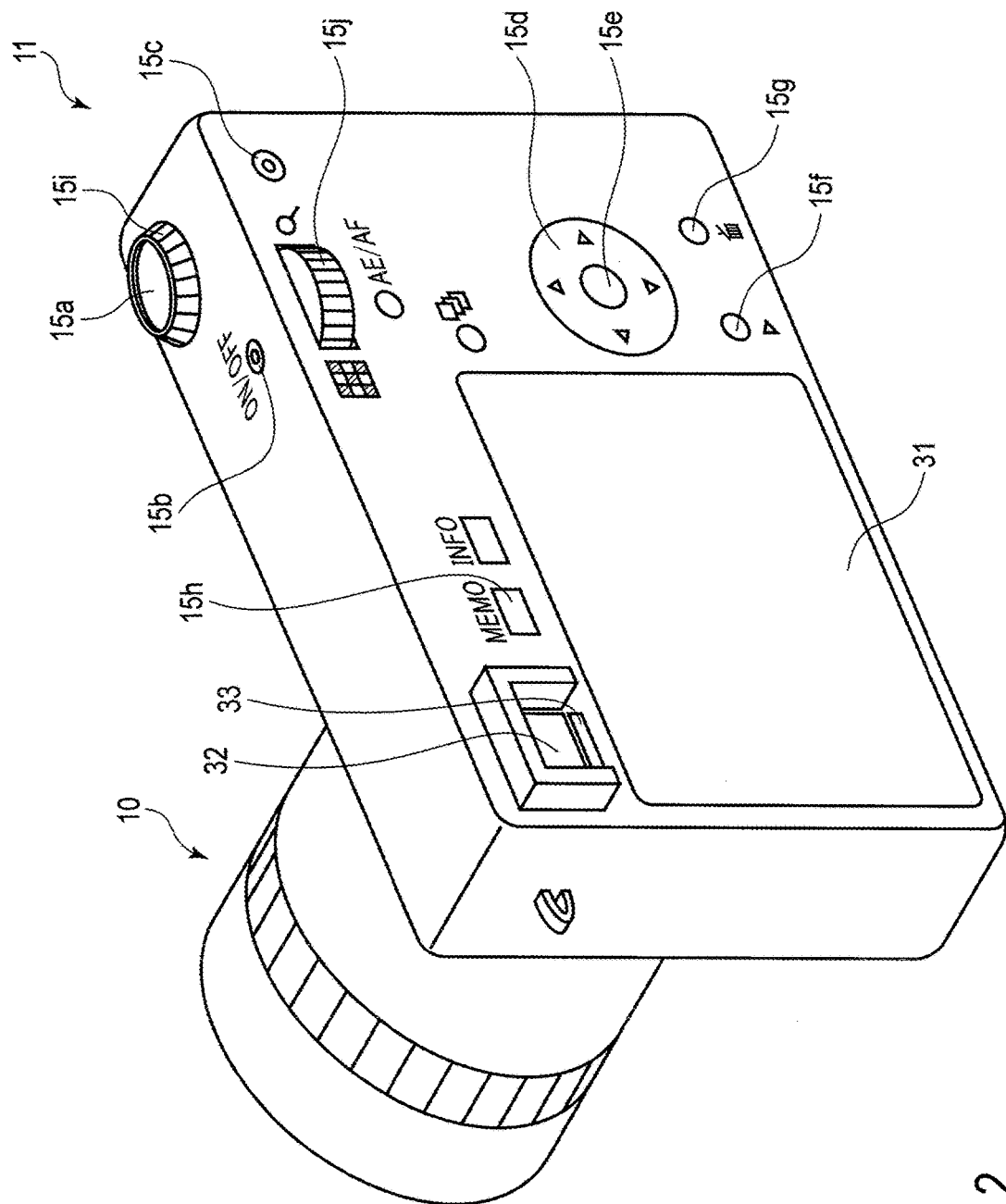
FIG. 2 is an illustration of an example of the outward appearance of the image pickup apparatus according to one embodiment.

As illustrated in FIGS. 1 and 2, an image pickup apparatus 1 includes a lens 10, a shutter unit 11, an image pickup device 12, a signal processing unit 13, an image processing unit 14, an operation unit 15, a display unit 16, a memory I/F 17, an acceleration sensor 18, and a main control unit 19, which are electrically connected to each other via data buses to allow different data items to be communicated.

The lens 10 is designed to transmit light and form an image of the light on the image pickup device 12. The lens 10 includes an image pickup lens in which a plurality of lenses are combined, a diaphragm mechanism, a lens control unit for controlling operations of the image pickup lens and the diaphragm mechanism, a focus ring, and a zoom ring.

The image pickup lens is designed to transmit a light ray from an object and form an image of the light ray on the imaging plane of the image pickup device 12. The image pickup lens includes a lens for focusing (a focus lens), a focal length varying lens (a variator lens and a compensator lens) and a relay lens. The image pickup lens moves the focus lens in the optical axis direction of the image pickup lens under the control of the lens control unit or by the operation of the focus ring to form an image of the object on the imaging plane of the image pickup device 12. The image pickup lens also moves the variator lens and the compensator lens in the optical axis direction of the image pickup lens under the control of the lens control unit or by the operation of the zoom ring to change a focal length.

The diaphragm mechanism is so configured that it can freely be opened or closed to adjust the amount of light that is incident upon the image pickup device 12 through the image pickup device, under the control of the lens control unit.

The lens control unit is configured to communicate with the main control unit 19. The lens control unit controls driving of the focus lens, that of the variator lens and the compensator lens and that of the diaphragm mechanism in accordance with an input from the main control unit 19, an operation of the focus ring and the operation of the zoom ring. Furthermore, the lens control unit is able to detect a focal length of the image pickup lens by detecting the positions of the variator lens and the compensator lens. The lens control unit supplies the detected focal length of the image pickup lens to the main control unit 19.

Figure 3:
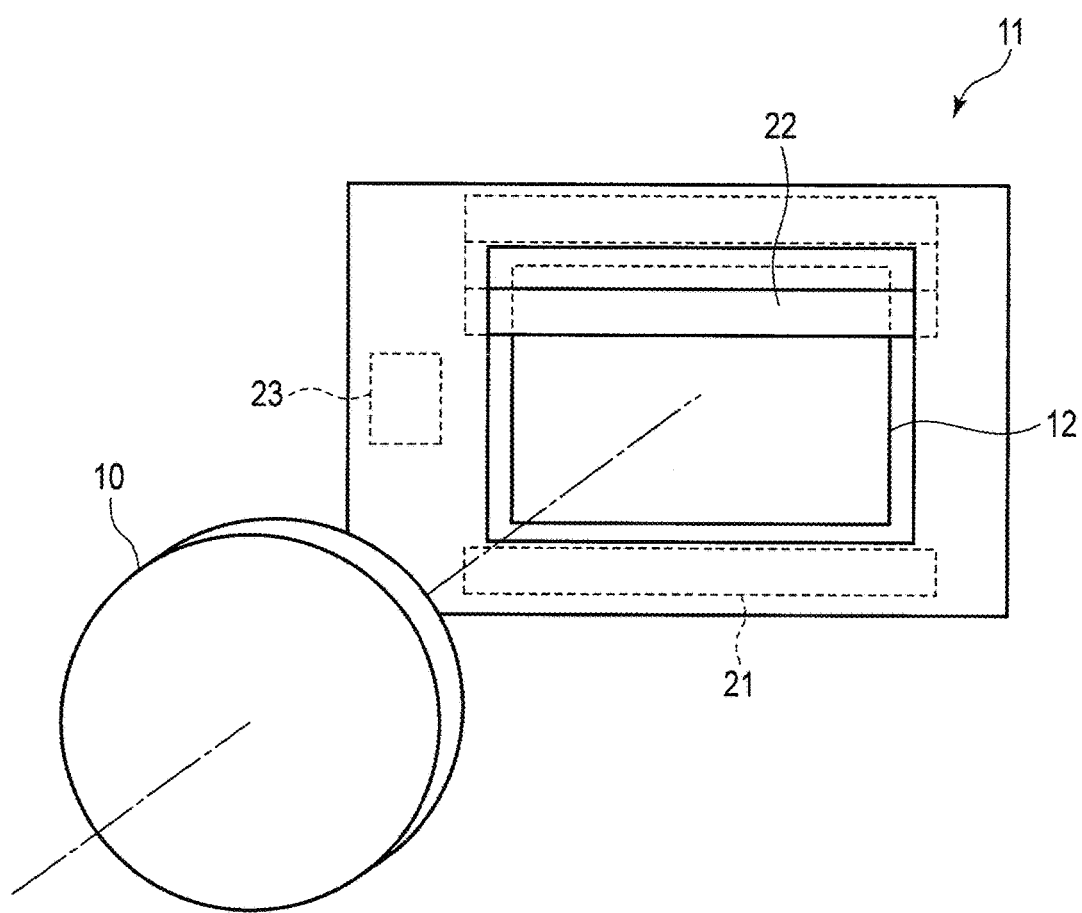
FIG. 3 is an illustration of an example of the configuration of a portion close to a shutter unit of the image pickup apparatus according to one embodiment.

The shutter unit 11 is a mechanism for adjusting the amount of light that is incident upon the image pickup device 12 through the lens 10. The shutter unit 11 is, for example, a focal plane shutter. As illustrated in FIG. 3, the shutter unit 11 is provided between the lens 10 and the image pickup device 12 to bring an open state in which light is incident upon the imaging plane of the image pickup device 12 through the lens 10 and a light-shielding state in which the imaging plane of the image pickup device 12 is shielded from the light transmitted through the lens 10. The shutter unit 11 includes a front curtain 21, a rear curtain 22, and a shutter driving unit 23 for driving the front and rear curtains 21 and 22. The shutter driving unit 23 operates the front and rear curtains 21 and 22 at speed and timing based upon a shutter speed supplied from the main control unit 19 to adjust exposure time when light is incident upon the imaging plane of the image pickup device 12 through the lens 10 and thus adjust the amount of light incident upon the image pickup device 12.

In an image pickup standby state in which the image pickup apparatus 1 is able to perform an imaging operation of recording a still image, the shutter unit 11 maintains an open state in which the front and rear curtains 21 and 22 are completely open. The front curtain 21 is provided in the lower part of the shutter unit 11 and the rear curtain 22 is provided in the upper part of the shutter unit 11. When an imaging operation is carried out, the shutter unit 11 starts to close the front curtain from bottom to top. The shutter unit 11 brings a semi-light-shielding state in which the image pickup device 12 is partly light-shielded by the front curtain 21, from when it starts to close the front curtain 21 until it completely closes the front curtain 21. When the front curtain 21 is completely closed, the shutter unit 11 starts to open the front curtain 21 from top to bottom and close the rear curtain 22 from top to bottom. In this case, light is incident upon the image pickup device 12 through a slit formed between the front curtain 21 that opens from top to bottom and the rear curtain 22 that closes from top to bottom. When the front curtain 21 completely opens and the rear curtain 22 completely closes, the shutter unit 11 starts to open the rear curtain 22 from bottom to top. The shutter unit 11 brings a semi-light-shielding state in which the image pickup device 12 is partly light-shielded by the rear curtain 22, from when it starts to open the rear curtain 22 until it completely opens the rear curtain 22. When the rear curtain 22 is completely opened, the front and rear curtains 21 and 22 are brought into an open state again and the image pickup apparatus 1 is brought into an image pickup standby state. The shutter unit 11 includes a sensor for sensing, e.g. an open/close state of each of the front and rear curtains 21 and 22. If the sensor senses an open/close state of each of the front and rear curtains 21 and 22, the shutter unit 11 is able to detect whether it is in an open state or a semi-light-shielding state. The shutter unit 11 includes an optical sensor such as a photocoupler or a magnetic sensor, as a sensor for sensing an open/close state of each of the front and rear curtains 21 and 22.

The image pickup device 12 is provided behind the lens 10, or inside the casing of the image pickup apparatus 1. The image pickup device 12 has an imaging plane on which a plurality of imaging pixels, which photoelectrically convert light into electric charges and store the electric charges, are arranged. A color filter is provided on the imaging plane upon which light of each of the imaging pixels is incident. The image pickup device 12 is configured by a charge coupled device (CCD) image sensor, a complementary metal oxide semiconductor (CMOS) image sensor or another image pickup device. The image pickup device 12 converts an object image, which is formed on the imaging plane by light collected through the lens 10, into an electrical signal corresponding to the amount of light to generate an image signal. Furthermore, the imaging plane of the image pickup device 12 has a plurality of AF areas. In the AF areas, a plurality of imaging pixels, a plurality of first focusing pixels and a plurality of second focusing pixels are arranged. The first and second focusing pixels are restricted by their different incident areas. Like the imaging pixels, the first and second focusing pixels photoelectrically convert incident light into electric charges and store the charges. The imaging plane of the image pickup device 12 is formed by, e.g. a plurality of imaging pixels arranged two-dimensionally. This two-dimensional arrangement does not necessarily exclude an image pickup device having sensitivity in its depth direction or an image pickup device having pixels arranged randomly, but may include these image pickup devices if they have at least pixels arranged on the plane. A curved sensor whose imaging plane is curved to prevent aberration has recently been announced and includes pixels arranged two-dimensionally; thus, this sensor is referred to herein as one including pixels arranged two-dimensionally in a broad sense.

The signal processing unit 13 reads an image signal captured by the image pickup device 12 under the control of the main control unit 19. The signal processing unit 13 performs different processes for the read image signal under the control of the main control unit 19. The signal processing unit 13 converts the processed image signal into image data of a digital signal and supplies it to the main control unit 19.

The image data includes a still image and a through image. The still image represents image data captured by the image pickup device 12 in accordance with the foregoing image pickup operation. The through image represents image data captured continuously by the image pickup device 12 when no image pickup operation is performed. For example, the signal processing unit 13 is able to capture continuous through images by reading through images picked up by the image pickup device 12 in a cycle based on the control of the main control unit 19. The signal processing unit 13 reads a through image from the image pickup device 12 in a cycle of 60 fps, 120 fps or the like.

The through image includes a first through image and a second through image. When the shutter unit 11 is opened, the signal processing unit 13 captures a first through image in which the shutter unit 11 does not block light transmitted through the lens 10. When the shutter unit 11 is rendered in a semi-light-shielding state, the signal processing unit 13 captures a second through image including a light-shielded area where the rear curtain 22 of the shutter unit 11 blocks part of light transmitted through the lens 10.

The image processing unit 14 performs different image processings, such as color correction, gamma (γ) correction, contrast correction, black and white/color mode processing and through-image processing, for image data under the control of the main control unit 19. Furthermore, the image processing unit 14 compresses image data in JPEG format under the control of the main control unit 19 and converts the compressed image data into JPEG data of JPEG-format image data. The image processing unit 14 supplies the JPEG data to the main control unit 19.

The operation unit 15 includes a plurality of operation members by which a user performs different operations of the image pickup apparatus 1. The operation members include a release button 15a, a power button 15b, a recording button 15c, a directional pad 15d, an OK button 15e, a play button 15f, a cancel button 15g, a menu button 15h, a first operation dial 15i, a second operation dial 15j and other different buttons.

The release button 15a is an operation member for causing a user to provide the image pickup apparatus 1 with an instruction for image pickup operation and image pickup auxiliary control to pick up a still image. The image pickup auxiliary control is a process such as an automatic exposure (AE) process and an automatic focusing (AF) process. The operation unit 15 provides the main control unit 19 with an instruction for image pickup auxiliary control when the release button 15a is half pushed. The operation unit 15 also provides the main control unit 19 with an instruction for image pickup operation to pick up a still image when the release button 15a is all pushed.

The power button 15b is an operation member for causing a user to provide the image pickup apparatus 1 with an instruction to turn on or off the image pickup apparatus 1.

The recording button 15c is an operation member for causing a user to provide the image pickup apparatus 1 with an instruction to start and finish picking up a moving image.

The directional pad 15d is an operation member for causing a user to provide the image pickup apparatus 1 with an instruction to select an operation corresponding to one of the left, right, top and bottom directions. For example, the operation unit 15 provides the main control unit 19 with an instruction to select an operation corresponding to one of the left, right, top and bottom directions in the menu in accordance with a user's operation of the directional pad 15d. Furthermore, for example, the operation unit 15 provides the main control unit 19 with an instruction to move an automatic focusing (AF) area on the imaging plane in accordance with a user's operation of the directional pad 15d.

The OK button 15E is an operation member for causing a user to provide the image pickup apparatus 1 with an instruction for execution. The OK button 15E is located, for example, at the center of the directional pad 15d.

The play button 15f is an operation member for causing a user to provide the image pickup apparatus 1 with an instruction for play. The operation unit 15 provides the main control unit 19 with an instruction to play a still image or a moving image recorded on a recording medium when a user operates the play button 15f.

The cancel button 15g is an operation member for causing a user to provide an instruction for cancellation. The operation unit 15 provides the main control unit 19 with an instruction to erase a still image or a moving image recorded on a recording medium when a user operates the cancel button 15g.

The menu button 15h is an operation member for causing a user to provide the image pickup apparatus 1 with an instruction to display a menu screen.

The first and second operation dials 15i and 15j are each an operation member for causing a user to provide the image pickup apparatus 1 with an instruction for exposure control. For example, the operation unit 15 provides the main control unit 19 with an instruction to change parameters for exposure control, such as a diaphragm value, a shutter speed, ISO and an exposure value when a user operates the first operation dial 15i or the second operation dial 15j.

Furthermore, the operation unit 15 can be configured to include a touch sensor that is formed integrally with a display device of the display unit 16. The touch sensor is, for example, a resistive touch sensor or a capacitive touch sensor. The operation unit 15 can be configured to receive a signal from the touch sensor to perform an operation corresponding to each of the operation members.

The display unit 16 displays a screen on the basis of image data supplied from the main control unit 19. The display unit 16 includes a display device and a drive circuit for causing the screen to be displayed on the display device on the basis of the image data. The display unit 16 includes, for example, a display panel 31 and an electronic view finder (EVF) 32 as the display device. The display unit 16 also includes an eye sensor 33 for sensing whether a user looks through the EVF 32. The display panel 31 is configured by a liquid crystal display, an organic EL display, a device for displaying another screen, or the like. The EVF 32 includes, for example, a display device such as a liquid crystal display and an organic EL display, and an eyepiece optical system.

When the eye sensor 33 senses that a user looks through the EVF 32, the display unit 16 turns off the display panel 31 to cause the EVF 32 to display a screen. When the eye sensor 33 does not sense that a user looks through the EVF 32, the display unit 16 turns off the EVF 32 to cause the display panel 31 to display a screen.

The memory I/F 17 includes a card slot into which a recording medium M with a plurality of contact terminals can be inserted and a contact terminal which is electrically connected to the contact terminals of the recording medium M when the recording medium M is inserted into the card slot. The recording medium M is, for example, a memory card. The memory I/F 17 relays data between the recording medium M and the main control unit 19.

The acceleration sensor 18 senses a variation in acceleration of the casing of the image pickup apparatus 1 to detect the inclination of the casing of the image pickup apparatus 1. The acceleration sensor 18 also senses a variation in acceleration of the casing of the image pickup apparatus 1 to detect whether the lens 10 and casing of the image pickup apparatus 1 are panned or not. In other words, the acceleration sensor 18 senses that a user follows an object by panning.

The main control unit 19 controls the operation of each unit of the image pickup apparatus 1. The main control unit 19 includes, for example, a CPU and a memory. The main control unit 19 fulfills different functions if the CPU reads a program out of the memory and executes it. For example, the main control unit 19 serves as an operation determination unit 40, an image pickup control unit 41, an image pickup auxiliary control unit 42, a recording control unit 43, a display control unit 44 and a state determination unit 45.

The operation determination unit 40 determines an operation input by the operation unit 15. In other words, the operation determination unit 40 recognizes what operation is instructed by the operation unit 15.

Upon receipt of an instruction to perform an image pickup operation, the image pickup control unit 41 controls each unit to perform the image pickup operation. When the image pickup control unit 41 receives an instruction to perform an image pickup operation, it inputs a control signal to the lens 10 to drive the diaphragm mechanism and also inputs a control signal to the shutter unit 11 to drive the front curtain 21 and the rear curtain 22, thus performing an image pickup operation of picking up a still image. The image pickup control unit 41 generates a control signal which is to be input to the shutter unit 11 and the lens 10 on the exposure conditions resulting from an operation or image pickup auxiliary control of the image pickup auxiliary control unit 42.

Furthermore, the image pickup control unit 41 is able to perform image pickup operations continuously. For example, when the image pickup control unit 41 receives an instruction to perform image pickup operations continuously, it inputs a control signal to the lens 10 to drive the diaphragm mechanism and operate the shutter unit 11 continuously, thus performing a continuous image pickup operation of performing image pickup operations continuously. For example, the image pickup control unit 41 switches between a mode (continuous image pickup mode) of performing a continuous image pickup operation and a mode of not performing a continuous image pickup operation in response to an operation of the operation unit 15.

Furthermore, the image pickup control unit 41 controls a through image picked up by the image pickup device 12. For example, the image pickup control unit 41 controls the signal processing unit 13 to read a through image picked up by the image pickup device 12 in a preset cycle. The image pickup control unit 41 controls the signal processing unit to capture a first through image with timing when the shutter unit 11 is rendered in an open state. The image pickup control unit 41 also controls the signal processing unit to capture a second through image with timing when the shutter unit 11 is rendered in a semi-light-shielding state.

The image pickup auxiliary control unit 42 performs image pickup auxiliary control prior to an image pickup operation. The image pickup auxiliary control unit 42 acquires information for image pickup auxiliary control and performs image pickup auxiliary control on the basis of the acquired information. For example, the image pickup auxiliary control unit 42 performs image pickup auxiliary control on the basis of a through image picked up by the image pickup device 12. The image pickup auxiliary control unit 42 performs an image pickup operation on the basis of a result of the image pickup auxiliary control. Since the image pickup device 12 is not able to pick up a through image during the image pickup operation, the image pickup auxiliary control unit 42 stops the image pickup auxiliary control during the image pickup operation.

In this embodiment, the image pickup auxiliary control unit 42 performs image pickup auxiliary control between an image pickup operation in the continuous image pickup mode and an image pickup operation. The image pickup auxiliary control unit 42 can be configured to apply a result of image pickup auxiliary control used in the first image pickup operation of the continuous image pickup operation in the continuous image pickup mode to another image pickup operation of the continuous image pickup operation.

The image pickup auxiliary control unit 42 includes, for example, an AF control unit 51, an exposure control unit 52, an angle-of-view control unit 53, a white balance (WB) control unit 54, a scene determination unit 55 and an inter-frame noise reduction (NR) processing unit 56.

The AF control unit 51 performs an AF process that is one of the image pickup auxiliary processes. For example, the AF control unit 51 generates a control signal for driving a focus lens of the lens 10 on the basis of image data output from the image pickup device 12 and inputs the generated control signal to the lens control unit. More specifically, the AF control unit 51 performs a contrast AF process, a phase difference AF process or another AF process on the basis of image data acquired in an arbitrary AF area on the imaging plane of the image pickup device 12 to generate a control signal for driving a focus lens of the lens 10. For example, the AF control unit 51 has a single autofocus mode (AF-S) in which AF is performed once when the release button 15a is half pushed, a continuous autofocus mode (AF-C) in which AF is performed continuously while the release button 15a is being half pushed, or another autofocus mode.

When the AF control unit 51 performs the contrast AF process, it computes a contrast of an object image formed in an arbitrary AF area on the imaging plane of the image pickup device 12 on the basis of image data output from the image pickup device 12 and supplies the lens control unit of the lens 10 with a control signal for moving the focus lens. The AF control unit 51 controls the lens control unit of the lens 10 to stop moving the focus lens in a position where the contrast becomes the highest.

When the AF control unit 51 performs the phase difference AF process, it compares the positions of images of the same object by image data detected by a plurality of first focusing pixels arranged in an arbitrary AF area on the imaging plane of the image pickup device 12 and image data detected by a plurality of second focusing pixels to detect an interval between the images. On the basis of the detected image interval, the AF control unit 51 computes an amount of shift between the current position of the focus lens and the focus position. The AF control unit 51 generates a control signal on the basis of the computed amount of shift and inputs the generated control signal to the lens control unit of the lens 10 to control the lens control unit of the lens 10 to move the focus lens to the focus position.

The exposure control unit 52 performs control of exposure conditions (exposure control) which is one of the image pickup auxiliary processes. For example, the exposure control unit 52 controls exposure conditions such as an amount of opening (diaphragm value) of the diaphragm mechanism of the lens 10, an open time of the shutter unit 11 (shutter speed), and sensitivity of the image pickup device 12 (ISO speed) at the time of image pickup. For example, the exposure control unit 52 sets exposure conditions such as a diaphragm value, a shutter speed and an ISO speed on the basis of the operation of the operation unit 15.

Furthermore, the exposure control unit 52 performs a computation process for exposure control on the basis of image data output from the image pickup device 12. For example, the exposure control unit 52 computes the brightness of an object on the basis of image data output from the image pickup device 12. The exposure control unit 52 sets an exposure value in accordance with an operation of the operation unit 15 and performs an AE process to set the exposure conditions such as a diaphragm value, a shutter speed, and an ISO speed at the time of image pickup in such a manner that the brightness of an object becomes equal to a preset exposure value. For example, the exposure control unit 52 computes the brightness of an object on the basis of an area (AE area) of part of the image data output from the image pickup device 12 to perform an AE process. Furthermore, for example, the exposure control unit 52 can be configured to compute the brightness of an object for each of the AE areas and integrate the brightnesses to perform an AE process.

The angle-of-view control unit 53 controls an angle of view which is one of the image pickup auxiliary processes. The angle-of-view control unit 53 recognizes the focal length of the image pickup lens on the basis of an input from the lens control unit of the lens 10 and performs control corresponding to the recognized focal length. Furthermore, the angle-of-view control unit 53 generates a control signal for changing the focal length of the image pickup lens of the lens 10 in accordance with the operation of the operation unit 15 and inputs the generated control signal to the lens control unit of the lens 10.

The WB control unit 54 performs WB control which is one of the image pickup auxiliary processes. The WB control unit 54 performs a computation process for controlling a white balance on the basis of image data output from the image pickup device 12. The WB control unit 54 controls a gain of each of RGB pixels of the image pickup device 12 on the basis of a result of the computation process.

The scene determination unit 55 performs a scene determination which is one of the image pickup auxiliary processes. The scene determination unit 55 determines a scene on the basis of image data output from the image pickup device 12. The scene is, for example, a landscape, a person, sports and a night view. For example, the scene determination unit 55 is able to supply information indicative of the determined scene to the exposure control unit 52 to cause the exposure control unit 52 to perform exposure control corresponding to the scene.

The inter-frame NR processing unit 56 performs an inter-frame NR process which is one of the image pickup auxiliary processes. The inter-frame NR processing unit 56 performs a noise reduction process of reducing noise of image data by the known algorithm using image data of a plurality of frames output from the image pickup device 12. For example, the inter-frame NR processing unit 56 performs smoothing all of a plurality of frames in such a manner that a difference in pixel value between coordinates of image data in a current frame and those of image data in its preceding frame becomes equal to or smaller than a preset value.

The recording control unit 43 includes an intermediate buffer for recording a still image and a moving image temporarily. The recording control unit 43 records, e.g. a still image and a moving image captured through an image pickup operation in the intermediate buffer one by one. The recording control unit 43 files the still image, the moving image, etc. recorded in the intermediate buffer and writes them to the recording medium M attached to the memory I/F 17. The filed still image is a file in which a predetermined header is added to image data of the still image. For example, data indicative of exposure conditions is recorded in the header as tag data.

The display control unit 44 controls a display process to be performed by the display unit 16. For example, the display control unit 44 supplies image data to the display unit 16 to control a screen to be displayed on the display device of the display unit 16. For example, the display control unit 44 supplies the display unit 16 with a still image generated by the image pickup device 12 through an image pickup operation to cause the display unit 16 to display the still image. Furthermore, the display control unit 44 supplies the display unit 16 with a through image read by the image pickup control unit 41 to cause the display unit 16 to display the through image. The display control unit 44 causes the display unit 16 to display a through image in a frame cycle of 60 fps, 120 fps or the like.

Moreover, the display control unit 44 generates OSD data for causing the display unit 16 to make an on-screen display (OSD) including, e.g. various icons and characters, on the basis of different items of setting information and a state of the image pickup apparatus 1. For example, the display control unit 44 generates OSD data for displaying on the display device of the display unit 16 an image pickup mode, different items of setting information, a battery remaining amount, the number of shots and a time period for which image pickup is available in the image pickup apparatus 1, an AF area and the like. The display control unit 44 supplies the display unit 16 with image data on which OSD display based on the OSD data is superimposed.

The state determination unit 45 recognizes different states of the image pickup apparatus 1. For example, the state determination unit 45 determines whether there is a light-shielded area on the through image. In accordance with an operating state of the shutter unit 11 when the image pickup device 12 picks up a through image, the state determination unit 45 determines whether the through image is a first through image or a second through image. For example, the state determination unit 45 determines that the through image is a second through image if the rear curtain 22 of the shutter unit 11 is being opened when the image pickup apparatus 12 picks up the through image.

Furthermore, the state determination unit 45 specifies a light-shielded area in the second through image. For example, the state determination unit 45 specifies a light-shielded area in the second through image on the basis of the position of the rear curtain 22 of the shutter unit 11 when the second through image is picked up. For example, the state determination unit 45 also specifies an area in the second through image, which is darker than a preset value, as a light-shielded area.

Figure 4:
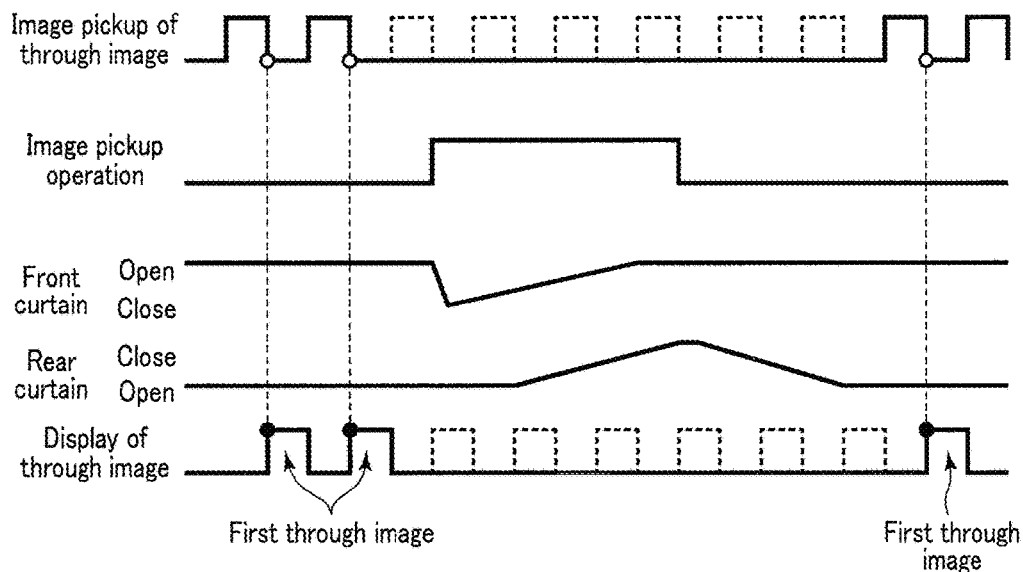
FIG. 4 is an illustration of an example of operation of the image pickup apparatus according to one embodiment.
Figure 5:
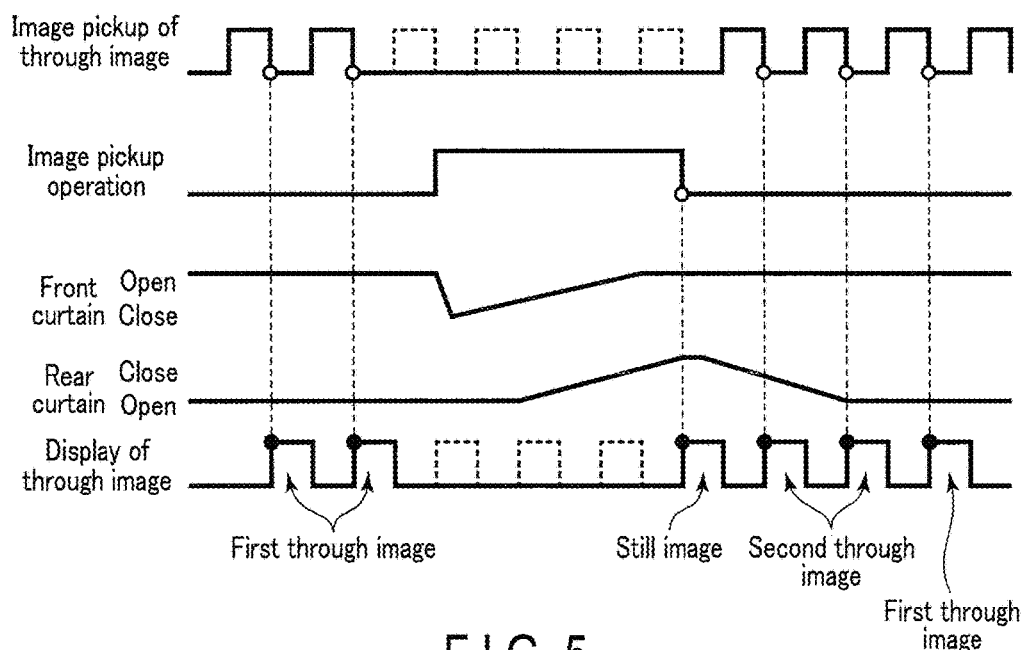
FIG. 5 is a timing chart showing an example of operation of the image pickup apparatus according to one embodiment.

FIGS. 4 and 5 are timing charts showing, from above, timing of image pickup of through image, image pickup operation, operation of front curtain 21 of shutter unit 11, operation of rear curtain 22 of shutter unit 11, display of through image, and display of advice. FIG. 4 shows an example in which the image pickup apparatus 1 is in a normal state that does not meet a specific condition. FIG. 5 shows an example in which the image pickup apparatus 1 is in a specific state that meets a specific condition.

For example, when the image pickup apparatus 1 is in the normal state, the display control unit 44 controls the display unit 16 to display a through image using a first through image. As shown in FIG. 4, the display control unit 44 supplies first through images captured under the control of the image pickup control unit 41, to the display unit 16 one by one to cause the display unit 16 to display a through image. Since a through image cannot be picked up by the image pickup device 12 during the image pickup operation, the display control unit 44 stops the display unit 16 from displaying the through image during the image pickup operation. When the rear curtain 22 of the shutter unit 11 is completely opened and the shutter unit 11 is opened after the image pickup operation, the display control unit 44 supplies a first through image 74 to the display unit 16 to resume displaying the through image on the display unit 16. After the image pickup operation, the display control unit 44 may display, for confirmation, a still image captured by the image pickup operation on the display unit 16 for a given period of time.

For example, as shown in FIG. 5, the display control unit 44 controls the display unit 16 to display a through image using an image including at least a second through image and a still image on a specific condition that the state of the image pickup apparatus 1 meets. After the image pickup operation, the display control unit 44 may supply the display unit 16 with a still image, which is captured by the image pickup operation immediately after the image pickup operation is completed, as a through image to cause the display unit 16 to display the through image. For example, the display control unit 44 causes the display unit 16 to display still images picked up by the image pickup operation as through images for one frame or a plurality of frames. In FIGS. 4 and 5, a process from opening to closing of the rear curtain is emphasized in order to emphasize timing when a through image is resumed; however, needless to say, a phenomenon in which the through image gradually disappears may occur even in a process from opening to closing of the front curtain. The slope from opening to closing of the front curtain in FIGS. 4 and 5 can be gentler. This state is not illustrated or described in detail for the sake of brevity because the point that trackability is improved if display control has only to be carried out such that a half-open phenomenon may occur is substantially described in this embodiment.

The specific condition represents a case where a user needs to confirm a through image earlier. In other words, the state determination unit 45 determines that the state of the image pickup apparatus 1 meets the specific condition when the image pickup apparatus 1 is in a state that requires shortening a time period from when a still image is completely picked up until image pickup auxiliary control is carried out (an image pickup state in which a time lag becomes a problem). For example, the state determination unit 45 recognizes a state of the image pickup apparatus 1 on the basis of a setting status of the image pickup control unit 41 and image pickup auxiliary control unit 42, an output of the eye sensor 33, an output of the acceleration sensor 18 and the like, and determines that the image pickup apparatus 1 is in a specific state if the recognized state of the image pickup apparatus 1 meets the specific condition.

The specific condition includes, for example, conditions that a user looks through the EVF 32 in a continuous image pickup mode, a user follows an object by panning, the mode of autofocus is an AF-C, the shutter speed is faster than a preset shutter speed, and the focal length of the image pickup lens of the lens 10 is greater than a preset focal length. That is, the state determination unit 45 determines that the state of the image pickup apparatus 1 meets the specific condition when the image pickup apparatus 1 corresponds to conditions, a user looks through the EVF 32 in a continuous image pickup mode, a user follows an object by panning, the mode of autofocus is an AF-C, the shutter speed is faster than a preset shutter speed, and the focal length of the image pickup lens of the lens 10 is greater than a preset focal length.

The preset shutter speed is, for example, a second of time corresponding to 1/focal length which easily exerts an influence of a camera shake or a second of time corresponding to $2^n$/focal length to which tolerance is added. In general, the preset shutter speed may be, for example, 1/250 second at which an object that moves quickly is picked up frequently.

The preset angle of view corresponds to, for example, a case where the focal length is 70 mm for telescopic imaging. In addition, the preset angle of view can be set as a given focal length which makes it difficult to frame a moving object.

For example, the state determination unit 45 may determine that the image pickup apparatus is in the specific state when an object distance is shorter than 60 cm of an object distance in the case of short-distance imaging such as macro photography.

An example of display by the display control unit 44 will now be described. In FIG. 6, the upper-left image is an example of the still image 71, the upper-right and lower-left images are an example of the second through image 73 including a light-shielded area 72, and the lower-right image is an example of the first through image 74. For example, as shown in FIG. 6, the display control unit 44 supplies the display unit 16 with the second through image 73 including a light-shielded area 72 to cause the display unit 16 to display the through image during a period from when the image pickup operation is completed until the rear curtain 22 of the shutter unit 11 is completely opened. When the rear curtain 22 of the shutter unit 11 is completely opened and the shutter unit 11 is opened, the display control unit 44 supplies the first through image 74 to the display unit 16 to cause the display unit 16 to display the through image.

The display control unit 44 includes, for example, an image processing unit 61 and an advice display unit 62.

The image processing unit 61 superimposes a superimposing image on the light-shielded area of a second through image to generate a superimposed through image. The superimposed through image is an image including at least the second through image and the superimposed through image. As shown in FIG. 5, the display control unit 44 controls the display unit 16 to display a through image using a still image and a superimposed through image generated by superimposing a superimposing image on an image including at least a second through image on a specific condition that the state of the image pickup apparatus 1 meets. For example, the display control unit 44 supplies the display unit 16 with the superimposed through image to cause the display unit 16 to display the through image during a period from when the image pickup operation is completed until the rear curtain 22 of the shutter unit 11 is completely opened. When the rear curtain 22 of the shutter unit 11 is completely opened and the shutter unit 11 is opened, the display control unit 44 supplies the first through image to the display unit 16 to cause the display unit 16 to display the through image.

The image processing unit 61 superimposes other image data (superimposing image) on the light-shielded area of a second through image to generate a superimposed through image. For example, the image processing unit 61 determines whether a second through image picked up by the image pickup device 12 and the last still image can be superimposed.

For example, the image processing unit 61 computes a similarity between the last still image and the second through image excluding the light-shielded area. When the computed similarity is equal to or larger than a preset value, the image processing unit 61 determines that the second through image and the last still image can be superimposed.

For example, the image processing unit 61 also extracts an object image common to the last still image and the second through image excluding a light-shielded area by pattern matching. When there is an object image common thereto, the image processing unit 61 determines that the second through image and the last still image can be superimposed.

When the image processing unit 61 determines that the second through image and the last still image can be superimposed, it superimposes the last still image on the light-shielded area of the second through image to generate a superimposed through image.

Figure 7:
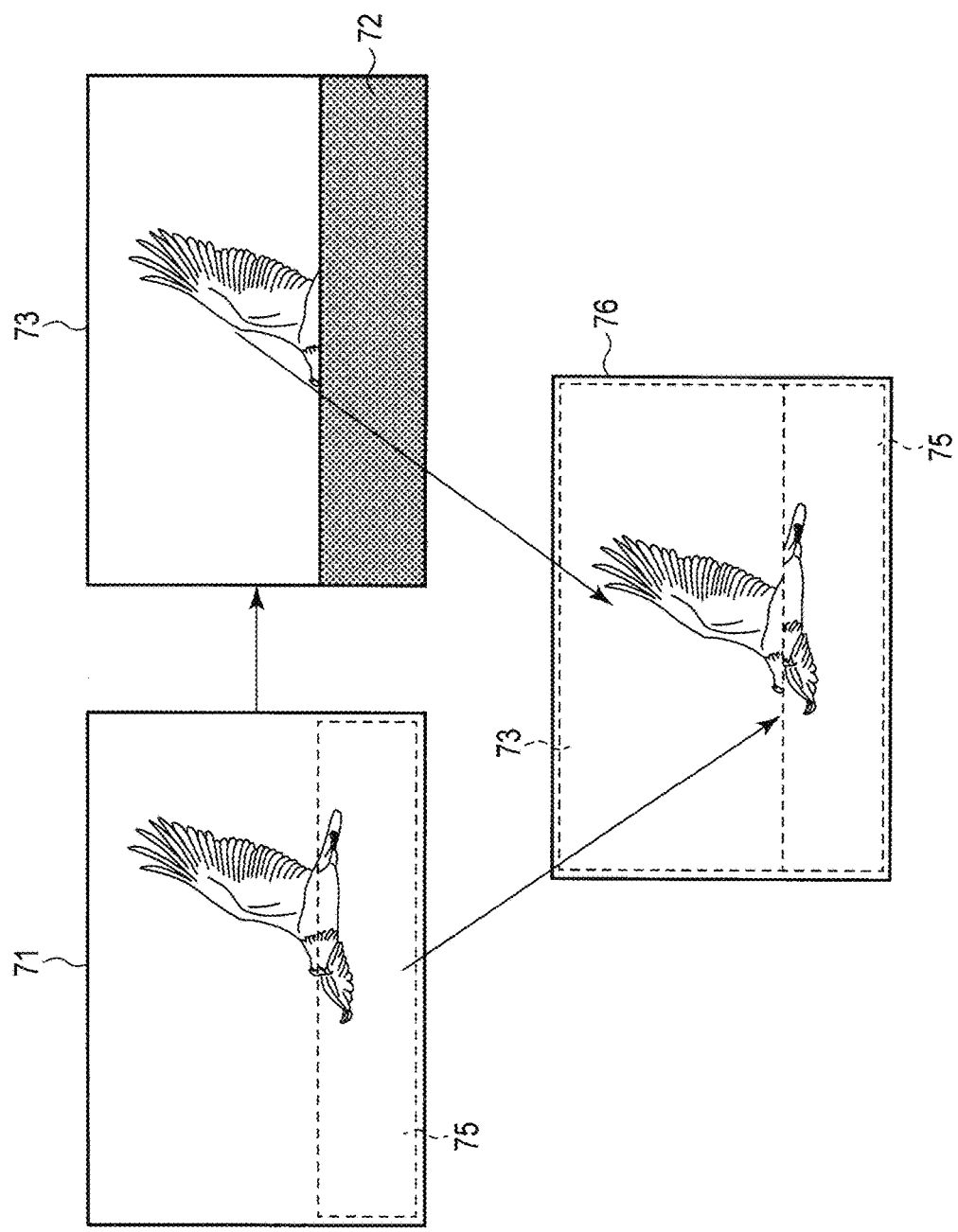
FIG. 7 is an illustration of another example of display of the image pickup apparatus according to one embodiment.

In FIG. 7, the upper-left image is an example of the still image 71, the upper-right image is an example of the second through image 73 including a light-shielded area 72, and the lower image is an example of a superimposed through image 76 formed by superimposing the still image 71 and the second through image 73. As shown in FIG. 7, the image processing unit 61 extracts an image of the same area as the light-shielded area 72 of the second through image 73 on the still image 71, as a to-be-superimposed image 75. The image processing unit 61 superimposes the extracted to-be-superimposed image 75 on the light-shielded area 72 of the second through image 73 to generate a synthesized through image 76 including the second through image 73 and the last still image 71.

Furthermore, for example, the image processing unit 61 corrects other image data and superimposes the corrected data on the light-shielded area of a second through image to generate a superimposed through image. In FIG. 8, the upper-left image is an example of the still image 71, the lower-left image is an example of the second through image 73 including a light-shielded area 72, the upper-right image is an example of a corrected to-be-superimposed image 75, and the lower-right image is an example of a superimposed through image 78 formed by superimposing the still image 71 and the second through image 73. For example, as shown in FIG. 8, the image processing unit 61 extracts an object image 77 common to the last still image 71 and the second through image 73 excluding the light-shielded area 72, and computes a difference in position in the horizontal-axis direction (longitudinal direction) of the object image 77 between the images.

The image processing unit 61 corrects the to-be-superimposed image 75 in the still image 71 using the computed difference. More specifically, the image processing unit. 61 corrects the position of the to-be-superimposed image 75 to cancel the computed difference and, in other words, the image processing unit 61 shifts the to-be-superimposed image 75 in the horizontal-axis direction by the computed difference. The image processing unit 61 superimposes the corrected to-be-superimposed image 75 on the light-shielded area 72 of the second through image 73 to generate a superimposed through image 78 of the corrected to-be-superimposed image 75 and the second through image 73. The image processing unit 61 makes setting as to whether the to-be-superimposed image 75 should be corrected in accordance with an operation of the operation unit 15. On the basis of this setting, the image processing unit 61 determines whether the to-be-superimposed image 75 should be corrected.

The image processing unit 61 can be configured to generate a superimposed through image 76 or a superimposed through image 78 by applying image processing, such as blurring and monochromatization, to the to-be-superimposed image 75 and then superimposing it to the second through image 73.

The advice display unit 62 generates an image by superimposing a superimposing image on an image including at least a second through image. For example, the advice display unit 62 generates an image by superimposing an advice display as a superimposing image on the light-shielded area of the second through image. For example, as shown in FIG. 5, the display control unit 44 may control the display unit 16 to display a through image using a still image and an image including an advice display and a second through image on the specific condition that the state of the image pickup apparatus 1 meets. For example, the display control unit 44 controls the display unit 16 to superimpose an advice display on the second through image and display a through image using the second through image on which the advice display is superimposed.

The advice display unit 62 generates an advice display that is information about photography. The advice display is useful information that is visually recognized by a user on the foregoing specific condition and may include whatever information. For example, the advice display unit 62 generates a display indicating whether an object can be tracked or not, as an advice display.

For example, the advice display unit 62 determines that an object can be tracked if a difference in position of the same object between image data of the current frame and that of the last frame is smaller than a preset threshold value. In other words, the advice display unit 62 determines that an object can be tracked if a difference in position of the same object between image data of two frames picked up continuously is smaller than a preset threshold value. More specifically, the advice display unit 62 determines that an object can be tracked if a difference in position of the same object between two second through images picked up continuously is smaller than a preset threshold value. Furthermore, immediately after the image pickup operation, the advice display unit 62 determines that an object can be tracked if a difference in position of the same object between a still image and a second through image picked up immediately after the still image is picked up is smaller than a preset threshold value. On the basis of a result of this determination, the advice display unit 62 generates an advice display indicating whether the object can be tracked. On the basis of a result of this determination, the advice display unit 62 generates an advice display indicating whether the object can be tracked correctly.

The advice display unit 62 superimposes one or more advice displays on an image including at least a second through image. For example, the advice display unit 62 superimposes an advice display on the light-shielded area in the second through image.

The advice display unit 62 also updates statuses of advice displays displayed on the light-shielded area in the second through image one by one. For example, the advice display unit 62 can be configured to determine the visibility of an advice display in accordance with the size of a light-shielded area specified by the state determination 45. More specifically, the advice display unit 62 increases the visibility of an advice display according to the fact that the light-shielded area of the second through image becomes narrower. For example, the advice display unit 62 releases the advice display according to the fact that the shutter unit 11 is opened and the light-shielded area of the second through image disappears.

The advice display unit 62 makes setting as to whether an advice should be displayed in accordance with an operation of the operation unit 15. On the basis of this setting, the advice display unit 62 determines whether an advice should be displayed.

Figure 9:
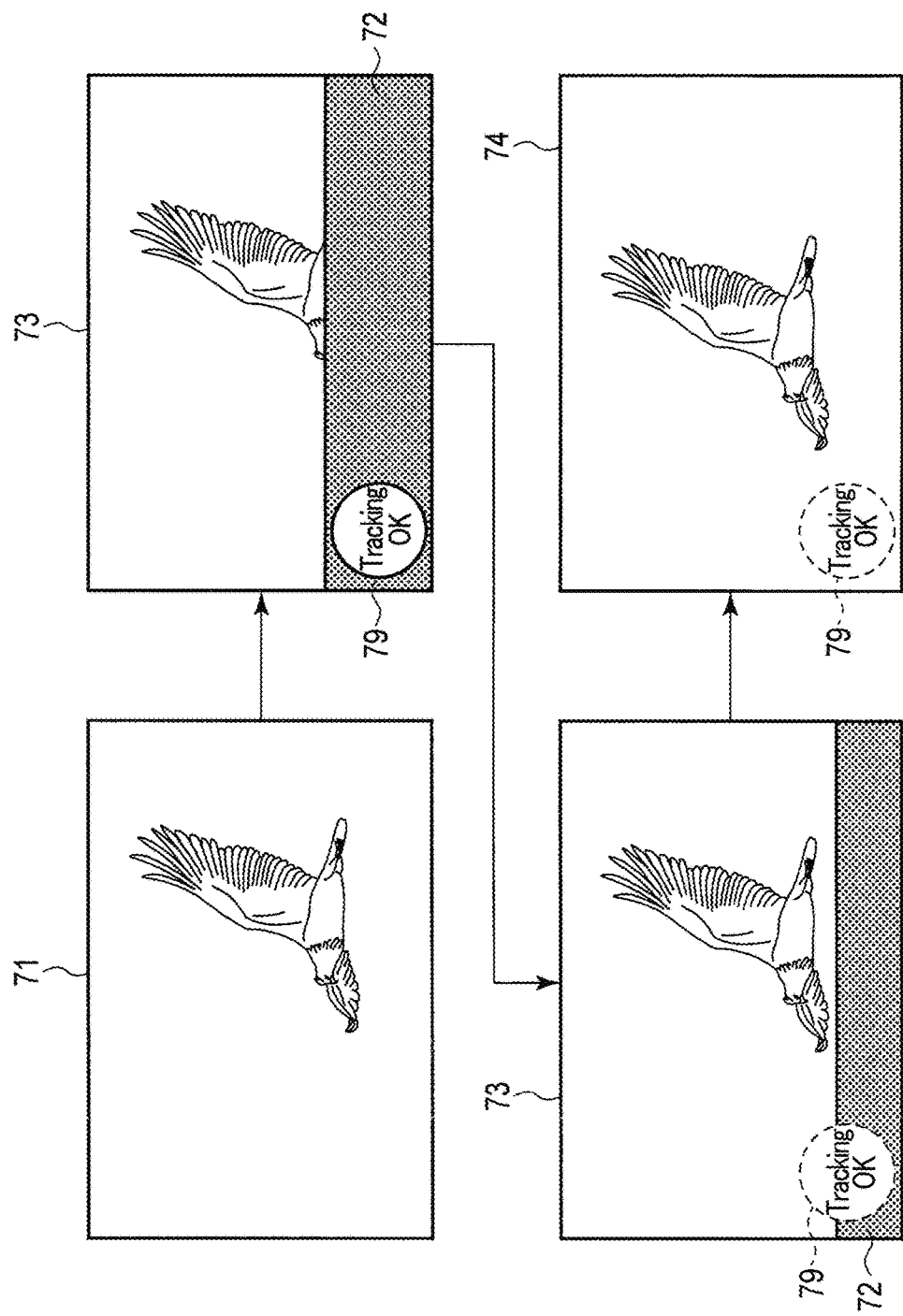
FIG. 9 is an illustration of yet another example of display of the image pickup apparatus according to one embodiment.

In FIG. 9, the upper-left image is an example of the still image 71, the upper-right and lower-left images are an example of the second through image 73 including a light-shielded area 72, and the lower-right image is an example of the first through image 74. For example, as shown in FIG. 9, the display control unit 44 supplies the display unit 16 with a second through image 73 formed by superimposing the advice display 79 on the light-shielded area 72 during a period from the image pickup operation is completed until the rear curtain 22 of the shutter unit 11 is completely opened, to cause the display unit 16 to display the through image. When the rear curtain 22 of the shutter unit 11 is completely opened and the shutter unit 11 is opened, the display control unit 44 supplies the first through image 74 to the display unit 16 to cause the display unit 16 to display the through image.

An operation of the image pickup apparatus 1 according to one embodiment will be described in detail with reference to FIGS. 10 and 11.

When the image pickup apparatus 1 is in an image pickup standby state, the main control unit 19 controls the image pickup device 12 to pick up a first through image 74 (step S11). The main control unit 19 supplies the first through image 74 to the display unit 16 to display the first through image 74 on the display device of the display unit 16 (step S12).

The main control unit 19 determines whether the release button 15a of the operation unit 15 is half pushed (step S13) and, in other words, the main control unit 19 determines whether the operation unit 15 supplies an operation to provide an instruction for image pickup auxiliary control such as an AE process and an AF process. When the main control unit 19 determines that the release button 15a of the operation unit 15 is half pushed (YES in step S13), it performs image pickup auxiliary control such as an AE process and an AF process (step S14).

The main control unit 19 determines whether the release button 15a of the operation unit 15 is all pushed (step S15) and, in other words, the main control unit 19 determines whether the operation unit 15 inputs an operation to provide an instruction for image pickup operation. When the main control unit 19 determines that the release button 15a of the operation unit 15 is all pushed (YES in step S15), it stops displaying a through image and performs an image pickup operation (step S16). In this case, the main control unit 19 operates the shutter unit 11, controls the image pickup device 12 to pick up a still image 71, files the still image and records the filed image on the recording medium M.

The main control unit 19 determines whether the state of the image pickup apparatus 1 meets the foregoing specific condition (step S17). When the main control unit 19 determines that the state of the image pickup apparatus 1 does not meet the specific condition (NO in step S17), it determines whether the shutter 11 is opened by opening the rear curtain 22 completely after the image pickup operation (step S18). In other words, the main control unit 19 determines whether the shutter unit 11 is opened after the image pickup operation. The main control unit 19 continues to perform a process of step S18 until the shutter unit 11 is opened.

When the main control unit 19 determines that the shutter unit 11 is opened (YES in step S18), it determines whether the process should be completed (step S19). In other words, for example, the main control unit 19 controls the operation unit 15 to operate the power button 15b and determines whether the operation unit 15 inputs an instruction to complete the process. When the main control unit 19 determines that the process should be completed (YES in step S19), it turns off the power to complete the process. When the main control unit 19 determines that the process should not be completed (NO in step S19), it returns to step S11.

When the main control unit 19 determines that the release button 15a of the operation unit 15 is not half pushed (NO in step S13), or when the main control unit 19 determines that the release button 15a is not all pushed (NO in step S15), it moves to step S19.

When the main control unit 19 determines that the state of the image pickup apparatus 1 does not meet the specific condition as described above, it stops displaying the first through image 74 during a period from after the image pickup operation is performed until the shutter unit 11 is opened.

When the main control unit 19 determines that the state of the image pickup apparatus 1 meets the specific condition (YES in step S17), it supplies the display unit 16 with the still image 71 captured through the image pickup operation in step S16, as a through image for a predetermined frame, to cause the display unit 16 to display the through image (step S21).

The main control unit 19 determines whether the shutter unit 11 is opened after the image pickup operation (step S22). When the main control unit 19 determines that the shutter unit 11 is opened after the image pickup operation (YES in step S22), it moves to step S19.

When the main control unit 19 determines that the shutter unit 11 is not opened after the image pickup operation (NO in step S22), it controls the image pickup device 12 to pick up the second through image 73 (step S23). The main control unit 19 supplies the second through image 73 to the display unit 16 to cause the display unit 16 to display the through image (step S24), and moves to step S22.

The main control unit 19 continues to perform the processes of steps S23 and S24 until the shutter unit 11 is opened after the image pickup operation.

According to the foregoing configuration, the display control unit 44 of the main control unit 19 causes the display unit 16 to display the still image 71 as a through image for a predetermined frame immediately after the image pickup operation is completed. The display control unit 44 causes the display unit 16 to display a second through image 73 including a light-shielded area 72, which is picked up by the image pickup device 12, during a period from when the image pickup operation is completed until the shutter unit 11 is opened. When the shutter unit 11 is opened, the display control unit 44 causes the display unit 16 to display the first through image 74 picked up by the image pickup device 12.

Therefore, when the image pickup apparatus 1 meets the specific condition, it is able to cause a through image to be displayed using the still image 71 and the second through image 73 during a period from when the image pickup operation is completed until the shutter unit 11 is opened. In other words, since the image pickup apparatus 1 is able to prevent display of a through image from being stopped with timing when the shutter unit 11 is not completely opened after the image pickup operation is completed, the possibility that a user could lose sight of an object can be lowered. It is thus possible to provide a more convenient image pickup apparatus and a method for controlling the image pickup apparatus.

Figure 12:
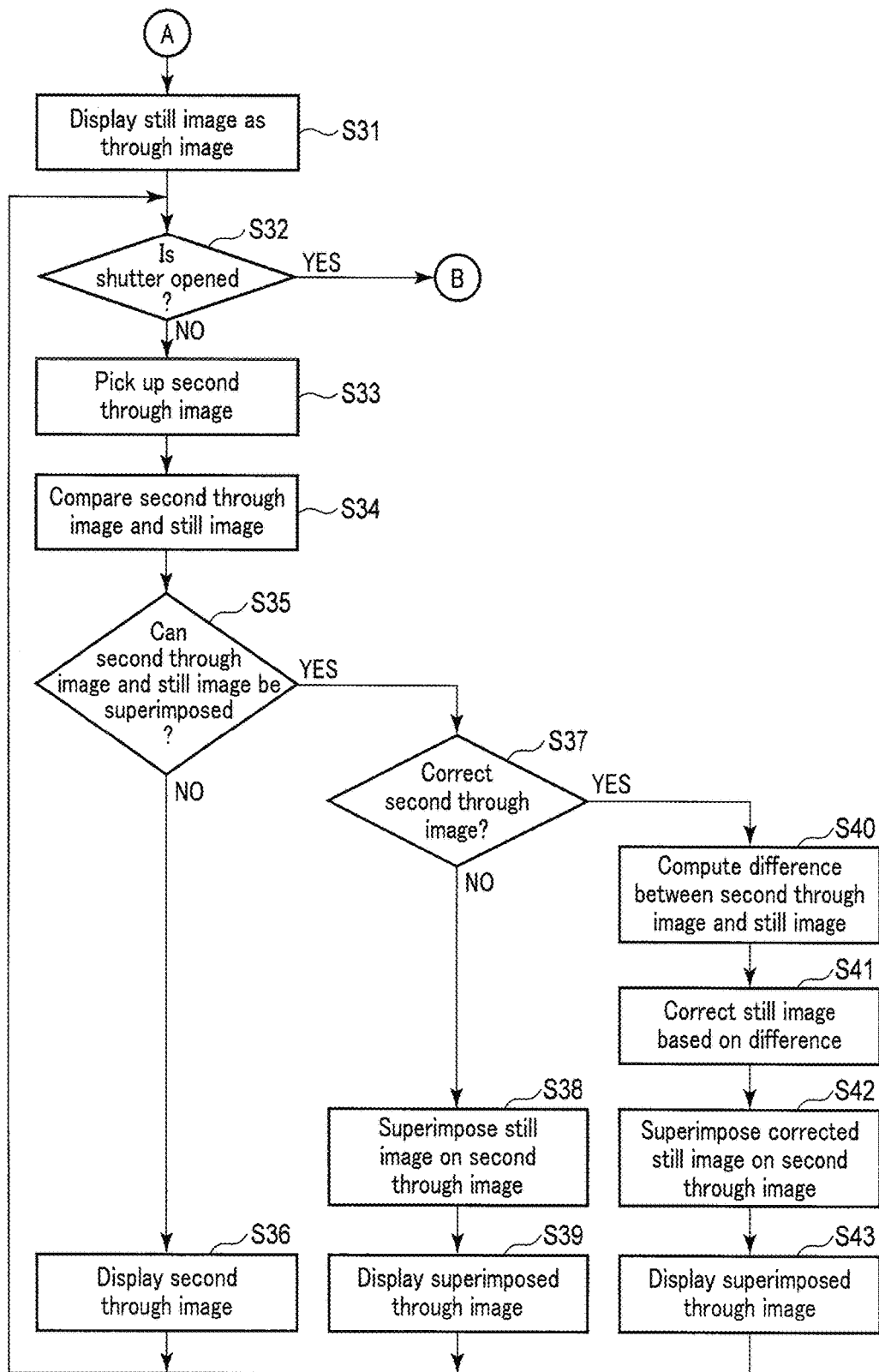
FIG. 12 is a flowchart showing still another example of operation of the image pickup apparatus according to one embodiment.
Figure 13:
FIG. 13 is a flowchart showing yet another example of operation of the image pickup apparatus according to one embodiment.

Another operation of the image pickup apparatus 1 according to one embodiment will be described in detail below with reference to FIGS. 10 and 12.

As described above, the main control unit 19 determines whether the state of the image pickup apparatus 1 meets the foregoing specific condition (step S17). When the main control unit 19 determines that the state of the image pickup apparatus 1 meets the specific condition (YES in step S17), it moves to step S31 in FIG. 12 to supply the display unit 16 with a still image 71 captured by the image pickup operation of step S16 as a through image for a predetermined frame and cause the display unit 16 to display the through image (step S31).

The main control unit 19 determines whether the shutter unit 11 is opened after the image pickup operation (step S32). When the main control unit 19 determines that the shutter unit 11 is opened (Yes in step S32), it moves to step S19 in FIG. 10.

When the main control unit 19 determines that the shutter unit 11 is not opened (No in step S32), it causes the image pickup device 12 to pick up a second through image 73 (step S33).

The main control unit 19 compares the still image 71 captured through the last image pickup operation and the second through image 73 captured in step S33 (step S34). On the basis of a result of the comparison, the main control unit 19 determines whether the second through image 73 picked up by the image pickup device 12 and the last still image 71 can be superimposed (step S35).

When the main control unit 19 determines that the second through image 73 and the last still image 71 cannot be superimposed (No in step S35), it supplies the second through image 73 to the display unit 16 to cause the display unit 16 to display the through image (step S36) and returns to step S32.

When the main control unit 19 determines that the second through image 73 and the last still image 71 can be superimposed (Yes in step S35), it determines whether a to-be-superimposed image 75 in the still image 71 should be corrected (step S37).

When the main control unit 19 determines that the to-be-superimposed image 75 should not be corrected (No in step S37), it superimposes the to-be-superimposed image 75 on a light-shielded area 72 of the second through image 73 to generate a superimposed through image 76 of the second through image 73 and the last still image 71 (step S38). The main control unit 19 supplies the display unit 16 with the superimposed through image 76 generated in step S38 to cause the display unit 16 to display the through image (step S39), and returns to step S32.

When the main control unit 19 determines that the to-be-superimposed image 75 should be corrected (Yes in step S37), it computes a difference in position in the horizontal-axis direction of an object image 77 common to the second through image 73 and the last still image 71 (step S40). The main control unit 19 corrects the to-be-superimposed image 75 on the basis of the difference computed in step S38 (step S41). The main control unit 19 superimposes the corrected to-be-superimposed image 75 on a light-shielded area of the second through image 73 to generate a superimposed through image 78 of the corrected to-be-superimposed image 75 and the second through image 73 (step S42). The main control unit 19 supplies the display unit 16 with the superimposed through image 78 generated in step S42 to cause the display unit 16 to display the through image (step S43), and returns to step S32.

The main control unit 19 continues to perform processes of steps S33 to S43 until the shutter unit 11 is opened after the image pickup operation.

According to the above processes of steps S38 and S39, the display control unit 44 of the main control unit 19 causes the display unit 16 to display the superimposed through image 76 during a period from when the image pickup operation is completed until the shutter unit 11 is opened. The display control unit 44 causes the display unit 16 to display the first through image after the shutter unit 11 is opened.

Therefore, when the image pickup apparatus 1 meets the specific condition, it is able to cause a through image to be displayed using the still image 71 and the superimposed through image 76 during a period from when the image pickup operation is completed until the shutter unit 11 is opened. In other words, since the image pickup apparatus 1 is able to prevent display of a through image from being stopped with timing when the shutter unit 11 is not completely opened after the image pickup operation is completed, the possibility that a user could lose sight of an object can be lowered. It is thus possible to provide a more convenient image pickup apparatus and a method for controlling the image pickup apparatus.

Furthermore, according to the above processes of steps S40 to S43, the display control unit 44 of the main control unit 19 corrects the to-be-superimposed image 75 of the still image 71 on the basis of a difference in position in the horizontal-axis direction of the object image 77 common to the second through image 73 and the last still image 71 and superimposes the to-be-superimposed image 75 on the light-shielded area of the second through image 73 to generate a superimposed through image 78. The image pickup apparatus 1 causes the display unit 16 to display the superimposed through image 78 and then display the through image during a period from when the image pickup operation is completed until the shutter unit 11 is opened, thus making it possible to prevent the through image from being displayed inaccurately Another operation of the image pickup apparatus 1 according to one embodiment will be described in detail below with reference to FIGS. 10-13.

As described above, the main control unit 19 determines whether the state of the image pickup apparatus 1 meets the foregoing specific condition (step S17). When the main control unit 19 determines that the state of the image pickup apparatus 1 meets the specific condition (YES in step S17), it moves to step S51 in FIG. 13 to supply the display unit 16 with a still image 71 captured by the image pickup operation of step S16 as a through image for a predetermined frame and cause the display unit 16 to display the through image (step S51).

The main control unit 19 determines whether the shutter unit 11 is opened after the image pickup operation (step S52).

When the main control unit 19 determines that the shutter unit 11 is not opened after the image pickup operation (NO in step S52), it causes the image pickup device 12 to pick up a second through image 73 (step S53). The main control unit 19 supplies the second through image 73 to the display unit 16 to cause the display unit 16 to display the through image (step S54).

The main control unit 19 determines whether an advice display 79 should be superimposed on the second through image 73 (step S55). When the main control unit 19 determines that an advice display 79 should not be superimposed on the second through image 73 (No in step S55), it returns to step S52.

When the main control unit 19 determines that an advice display 79 should not be superimposed on the second through image 73 (YES in step S55), it determines whether the advice display 79 is being displayed (step S56). In other words, the main control unit 19 determines whether an advice 79 has already been superimposed on the second through image 73 and displayed.

When the main control unit 19 determines that an advice display 79 is not being displayed (NO in step 56), it generates an advice display 79 (step S57). The main control unit 19 superimposes the generated advice display 79 on the second through image 73 and displayed (step S58), and returns to step S52.

When the main control unit 19 determines that an advice display 79 is being displayed (YES in step 56), it updates the display state of the advice display 79 (step S59) and returns to step S52.

The main control unit 19 continues to perform the processes of steps S53 to S59 until the shutter unit 11 is opened after the image pickup operation.

Figure 10:
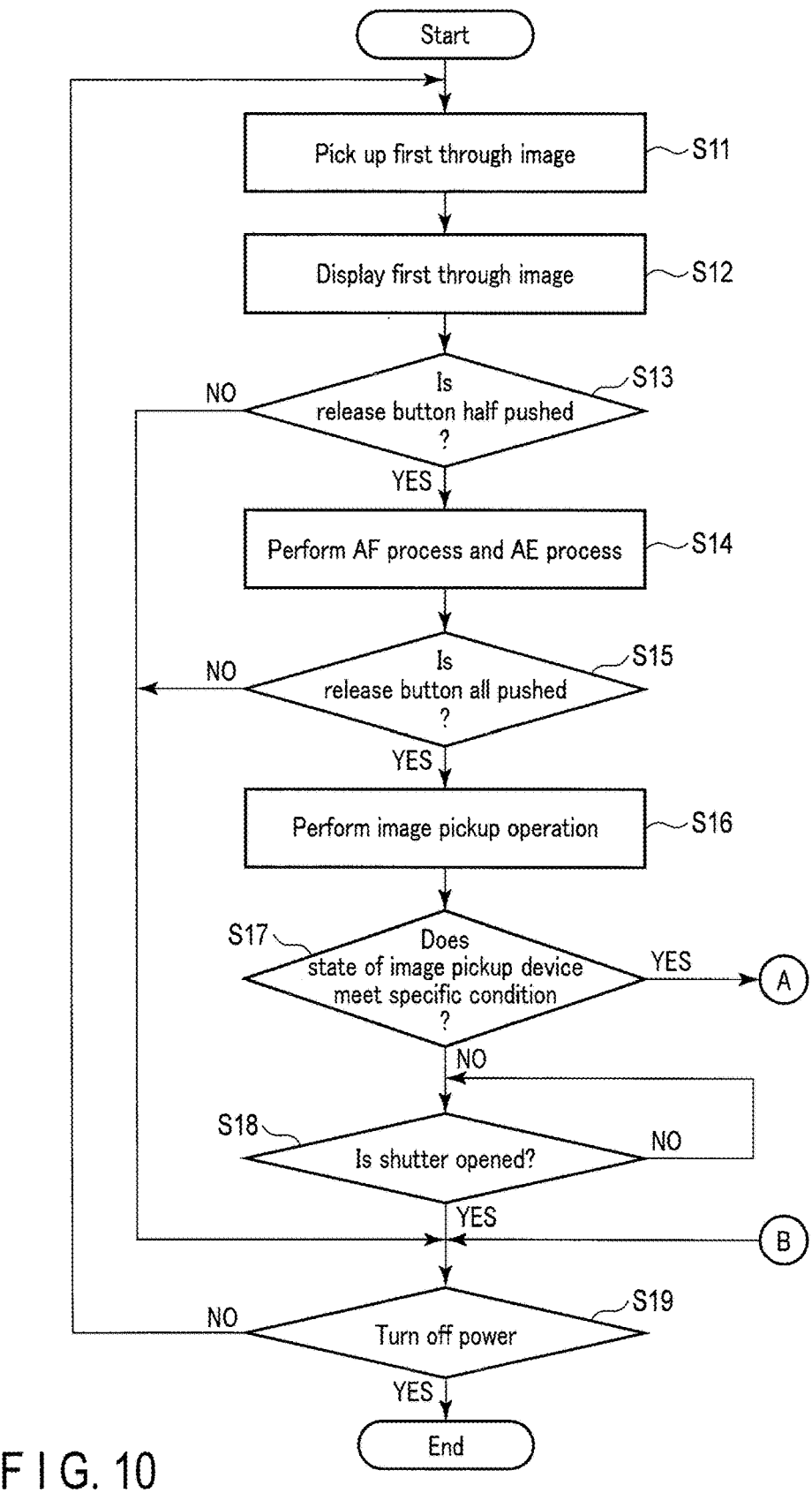
FIG. 10 is a flowchart showing an example of operation of the image pickup apparatus according to one embodiment.
Figure 11:
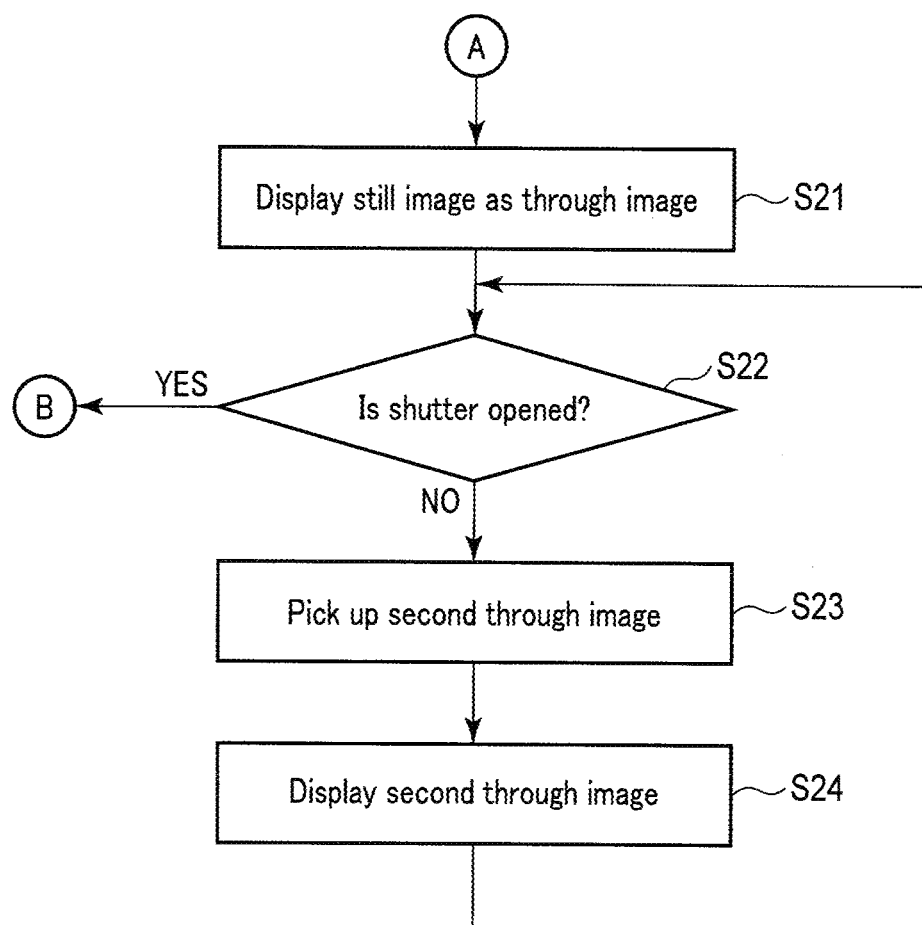
FIG. 11 is a flowchart showing another example of operation of the image pickup apparatus according to one embodiment.

When the main control unit 19 determines that the shutter unit 11 is opened after the image pickup operation (YES in step S52), it releases the advice display 79 (step S60) and moves to step S19 in FIG. 10.

According to the foregoing configuration, when the state of the image pickup apparatus 1 meets the specific condition, the display control unit 44 of the main control unit 19 causes the display unit 16 to display the still image 71 immediately after the image pickup operation is completed. The display control unit 44 causes the display unit 16 to display the second through image 73, which is formed by superimposing the advice display 79 on the light-shielded area 72 and picked up by the image pickup device 12, during a period from when the image pickup operation is completed until the shutter unit 11 is opened. When the shutter unit 11 is opened, the display control unit 44 causes the display unit 16 to display the first through image 74 picked up by the image pickup device 12. The present invention is not limited to the period from when the image pickup operation is completed until the shutter unit 11 is opened. In order to increase the visibility of an advice, the shutter unit can be opened or the advice can be output for a while. If the advice can be recognized by intuition by pattern recognition, such as OK/NG determination and a histogram, it may be canceled soon to avoid a complicated operation. If a limited time and a display space are effectively used in addition to a period of time for which the closing of the shutter unit can be seen to allow a user to shift to a next action quickly, the object of the present invention can be attained.

Therefore, the image pickup apparatus 1 is so configured that a user can visually recognize an advice display that is information about photography with timing when the shutter unit 11 is not completely opened. As a result, there can be provided a more convenient image pickup apparatus and a method for controlling the image pickup apparatus.

An example of making a display indicating whether an object can be tracked or not has been described above as an example of the advice display 79; however, the present invention is not limited to this example. The advice display unit 62 can be configured to generate, as the advice display 79, a display of the histogram of the still image 71 picked up by the image pickup device 12, a display indicating a position of the AF area in the still image 71, a display indicating the remaining amount of the intermediate buffer in the recording control unit 43, the number of images that can continuously be picked up as many as possible, an alarm about a camera shake, a thumbnail of the still image 71 that has already been picked up, and the like.

Figure 14:
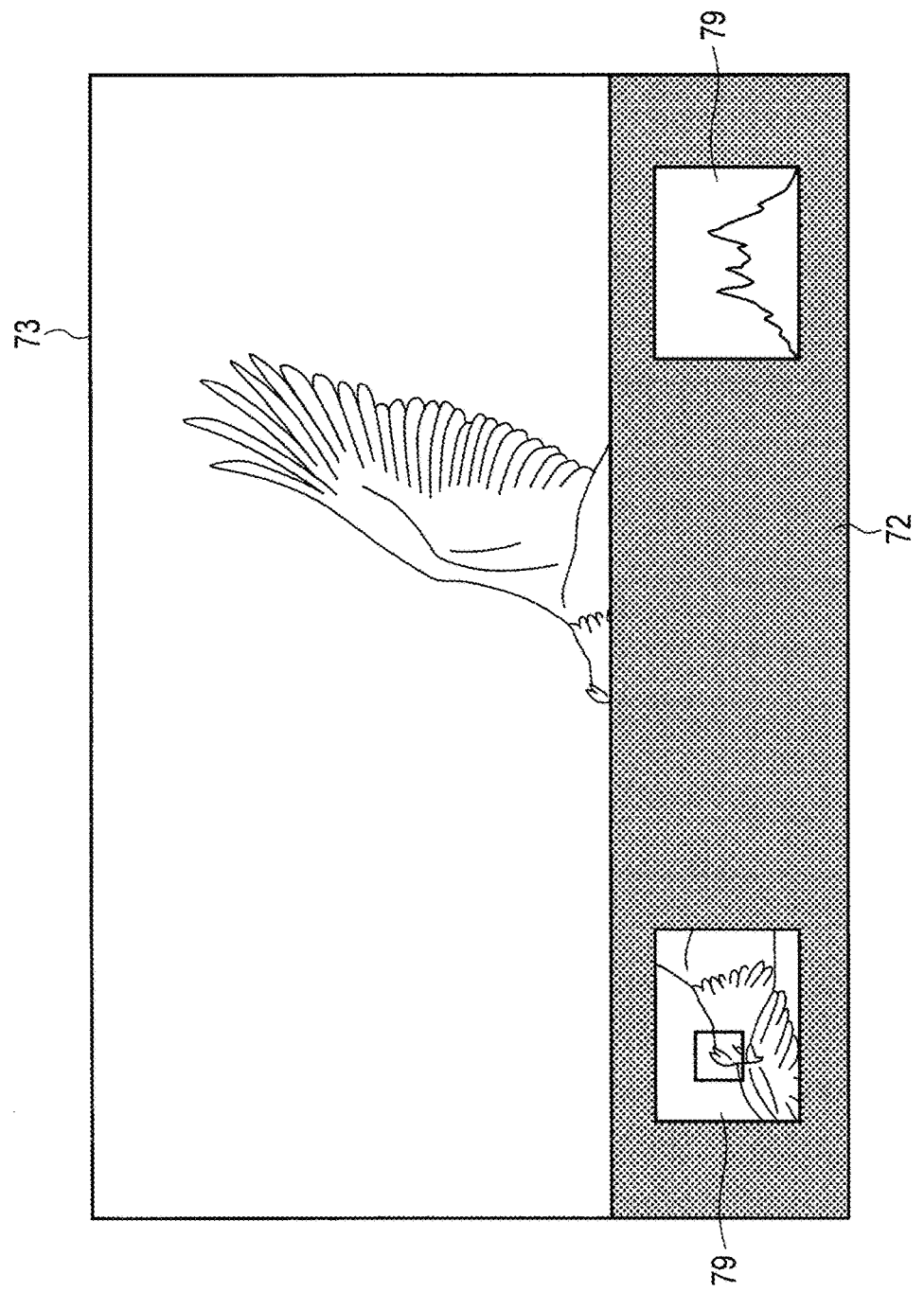
FIG. 14 is an illustration of another example of display of the image pickup apparatus according to one embodiment.

FIG. 14 shows an example of displaying, as the advice display 79, a display of the histogram of the still image 71 picked up by the image pickup device 12 and a display indicating a position of the AF area in the still image 71. FIG. 15 shows an example of displaying, as the advice display 79, a thumbnail of the still image 71 that has already been picked up. The advice display unit 62 makes setting as to what content is displayed as the advice display 79 in accordance with an input operation by the operation unit 15. On the basis of this setting, the advice display unit 62 determines a content to be displayed as the advice display 79.

Furthermore, for example, the advice display unit 62 can be configured to determine a type of the advice display 79 to be displayed, according to the specific condition that the state of the image pickup apparatus 1 meets. For example, the advice display unit 62 includes a memory for storing, e.g. a table to which the type of the advice display 79 is caused to correspond for each specific condition. The advice display unit 62 specifies one specific condition in accordance with the state of the image pickup apparatus 1 from the table and determines a content to be displayed as the advice display 79 according to the specified specific condition.

In the foregoing embodiment, furthermore, the advice display unit 62 is so configured to release the advice display 79 when the shutter unit 11 is opened; however, the present invention is not limited to this configuration. The advice display unit 62 can be configured to display the advice display 79 for a preset time period after the advice display 79 is displayed first.

The advice display unit 62 can be configured to display the advice display 79 for a preset time period after the advice display 79 is displayed first and increase the visibility of the advice display 79 according to the elapsed time.

In the foregoing embodiment, the image pickup apparatus 1 is configured to include the lens 10; however, the present invention is not limited to this configuration. The image pickup apparatus 1 is configured to include a detachable mount lens in place of the lens 10.

Not only the functions of the foregoing embodiments are carried out by hardware, but also the programs describing the functions using software can be read in a computer and executed. The functions can also be carried out by choosing one of software and hardware appropriately.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus comprising:
an image pickup device including an imaging plane on which imaging pixels are arranged;
a shutter unit which adjusts an amount of light incident upon the imaging plane;
an image pickup control unit which drives the shutter unit and picks up a still image by the image pickup device, captures a first through image by the image pickup device when the shutter unit is opened, and picks up a second through image including a light-shielded area by the image pickup device, the light-shielded area being formed by shielding part of light incident upon the imaging plane by the shutter unit when the shutter unit is partly light-shielded; and
a display control unit which causes a display device to display a through image using at least the first through image and the second through image,
wherein the display control unit superimposes a superimposing image on the light-shielded area of the second through image to cause the display device to display a through image based on the second through image on which the superimposing image is superimposed, wherein the display control unit includes an advice display unit which superimposes an advice display on the second through image as the superimposing image during a period from when the still image is completely picked up until at least the shutter unit is opened.

2. The image pickup apparatus according to claim 1, wherein the advice display unit superimposes the advice display on the light-shielded area of the second through image.

3. The image pickup apparatus according to claim 1, wherein the advice display unit superimposes the advice display on the first through image after the shutter unit is opened to increase visibility of the advice display according to time elapsed after the shutter unit is opened.

4. The image pickup apparatus according to claim 1, wherein the advice display unit displays the advice display for a preset time period.

5. The image pickup apparatus according to claim 1, wherein the advice display unit superimposes a display indicating whether object images picked up continuously by the image pickup device are correctly tracked, as the advice display, on the second through image.

6. A method for controlling an image pickup apparatus including an image pickup device including an imaging plane on which imaging pixels are arranged, and a shutter unit which adjusts an amount of light incident upon the imaging plane, the method comprising:

driving the shutter unit and picking up a still image by the image pickup device;

capturing a first through image by the image pickup device when the shutter unit is opened;

picking up a second through image including a light-shielded area by the image pickup device, the light-shielded area being formed by shielding part of light incident upon the imaging plane by the shutter unit when the shutter unit is partly light-shielded; and causing a display device to display a through image using at least the first through image and the second through image, and to display the through image using the second through image in which an advice display is superimposed on the light-shielded area, during a period from when the still image is completely picked up until at least the shutter unit is opened.

7. A non-transitory computer-readable medium storing a computer program for an image pickup apparatus including an image pickup device including an imaging plane on which imaging pixels are arranged, and a shutter unit which adjusts an amount of light incident upon the imaging plane, the computer program, when executed by the image pickup apparatus, causes the image pickup apparatus to perform a method comprising:

driving the shutter unit and picking up a still image by the image pickup device;

capturing a first through image by the image pickup device when the shutter unit is opened;

picking up a second through image including a light-shielded area by the image pickup device, the light-shielded area being formed by shielding part of light incident upon the imaging plane by the shutter unit when the shutter unit is partly light-shielded; and causing a display device to display a through image using at least the first through image and the second through image, and to display the through image using the second through image in which an advice display is superimposed on the light-shielded area, during a period from when the still image is completely picked up until at least the shutter unit is opened.

* * * * *